Patented May 21, 1935

2,002,198

UNITED STATES PATENT OFFICE 2,002,198

SURFACE HARDENING METAL ARTICLES

William A. Wissler, Flushing, N. Y., assignor to Haynes Stellite Company, a corporation of Indiana No Drawing. Application November 19, 1931, Serial No. 576,202

18 Claims. (Cl. 219—10)

My invention relates to the art of surface-hardening metal articles such as portions of tools used for well drilling and other purposes where a metal surface that is highly resistant to wear is essential. More particularly, the invention relates to an improved welding rod and to a process of producing a wear-resistant coating with such a rod.

Alloys, such as those known commercially as tungsten carbide or diamond substitute, have been applied in various ways to oil well bits and other tools to hard face the cutting and wearing portions thereof. Pieces of tungsten carbide alloy or diamond substitute, of such size that they may be handled one at a time, have been set in spaced relation on a wearing surface and welded thereto by fusion depositing metal such as steel or iron onto said surface about and between the hard pieces. More recently it has been found that better results for some purposes are obtained by applying the diamond substitute to the wearing surface as smaller pieces and closer together. Because of their small size, it has been impracticable to apply these smaller pieces by the former process, so a steel tube has been filled with a quantity of such smaller pieces and they have been applied to the wearing surface by fusing the end of the tube by high-temperature heat such as an oxyacetylene welding flame, thereby simultaneously depositing the separate granular pieces with the molten metal of the tube on the work. This procedure has a number of objectionable features: some of the expensive granulated tungsten carbide is blown away by the welding flame or otherwise lost when it is being applied to the work; and the following things must be done simultaneously at the instant of forming the coating and uniting it to the work: the metal of the retaining tube must be melted by the welding flame; the particles of tungsten carbide or diamond substitute must be heated to a high temperature and surface-alloyed with the molten tube metal; the resulting mixture must be deposited upon and welded to the steel base or work; and the hard particles must be distributed uniformly throughout the deposited molten metal before the latter solidifies.

The main objects of the present invention are to overcome these difficulties; to simplify the procedure and reduce the expense of applying the wear-resistant coating; to avoid the loss of costly hard metal such as tungsten carbide; to produce a wear-resistant coating that is uniform and of superior quality and to provide a composite welding rod that is particularly adapted for this purpose.

Generally speaking, the improved process of surface hardening is preferably performed with a composite welding rod that comprises granular particles of diamond substitute or tungsten carbide alloy substantially evenly distributed in and bonded to a matrix of metal having a lower fusion point than the particles, so that when the high temperature heat of an oxyacetylene flame or an electric arc is applied to the welding rod, the matrix metal will be melted and carry the harder particles with it onto the metal surface to which the coating is applied. This expedites the hard-facing procedure since the particles of tungsten carbide are already uniformly distributed in and surface-alloyed with the matrix metal in the welding rod and will be more readily and securely bonded to the resultant coating, and none of the costly particles will be lost since they are carried directly onto the work with the fused matrix metal. Hence, the use of this rod for hard-facing produces a superior coating and affords considerable economy of material and time.

An improved welding rod embodying my invention may be made in various ways. For example, the matrix metal may consist of a non-ferrous metal composition known as "Stellite" which has a melting point of about 1260° C. and contains about 32% chromium, about 14% tungsten, about 2½% carbon, small amounts of silicon and manganese to improve its welding properties, the balance being mainly cobalt but including traces of commercial impurities such as iron and nickel. A suitable quantity of this matrix metal may be melted in a crucible and to this molten metal may be added an equal amount by weight of a crushed tungsten carbide alloy known as "Haystellite" having a melting point of from about 2300° to 2500° C. and containing about 11% cobalt, about 4% to 5% carbon and about 85% tungsten. The fragments or pieces of tungsten carbide alloy will be jagged or faceted and may be about $\frac{1}{16}$ inch to $\frac{3}{32}$ inch in size or diameter and, because of their greater specific gravity, will sink in the molten matrix metal. The excess of the latter may be poured from the top of the crucible, leaving a mixture of about 30% matrix metal and about 70% of tungsten carbide alloy. This mixture, while the matrix metal is still plastic, may be dumped into an open top elongated or rod mold and allowed to cool, thus producing a welding rod in which the granules of tungsten carbide alloy are evenly distributed throughout the matrix metal of lower melting point which occupies the inter-granular spaces and is surface-alloyed to these granules. The operation of adding the tungsten carbide alloy, pouring off the excess of matrix metal, and dumping the mixture in the rod mold, is preferably done quickly in order to avoid excessive inter-alloying of the matrix metal and the tungsten carbide alloy.

The composite welding rod of my invention is especially adapted for use in hard surfacing metals. For example, in coating a metal surface such as the wearing surface of a drilling tool, I may employ an oxyacetylene flame containing an excess of acetylene, first sufficiently heating the surface to be coated to "sweat" it or raise it to incipient fusion. One end of the above-described composite welding rod is then held in the flame in the usual way so that the more readily fusible matrix metal will be fused, whereupon this fused metal and the unfused hard granules will be deposited simultaneously onto the "sweated" surface, thereby welding to the "sweated" surface the matrix metal and the evenly distributed tungsten carbide particles which are surface-alloyed to and bonded together by such matrix metal. Where desired, the wear-resistant coating may be built up to any desired thickness by successive deposits of the composite welding rod.

The essential features of a welding rod adapted for and embodying the present invention are that it shall consist of small pieces or particles of a hard wear-resistant material substantially uniformly distributed throughout and surface-alloyed with a more readily fusible matrix metal that may be united to a metal surface by welding without materially altering the properties or identity of the harder particles which are deposited with the matrix metal. Obviously, the matrix metal for the hard granular material, such as particles of tungsten carbide, may consist of either ferrous metals or alloys such as iron or steel, or non-ferrous metals or alloys such as copper or bronze. On the other hand, other granular or finely-divided hard material may be employed satisfactorily, in place of tungsten carbide or diamond substitute, in some types of hard-facing welding rods, i. e., a matrix metal of either copper or bronze may contain uniformly distributed particles of granular or finely-divided metal such as the above-mentioned "Stellite" which is harder and less readily fusible than either copper or bronze and is surface-alloyed with the latter. For any particular composite welding rod it is necessary, of course, to select a matrix metal or alloy which has a melting point that is sufficiently lower than the melting point of the incorporated particles of wear-resistant material to avoid melting or materially altering the identity of these particles when the rod is being deposited on the work.

I claim:

1. Process of hard facing a metal article which comprises applying high temperature heat to a surface of said article to superficially fuse the same; melting the more readily fusible matrix portion of a composite welding rod having granular particles of wear-resistant material substantially uniformly distributed in and surface-alloyed to the more readily fusible matrix material; and depositing such molten material and the particles therein onto such superficially fused surface.

2. Process of hard facing a metal article which comprises applying an oxyacetylene flame to a surface of said article to superficially fuse the same; melting the more readily fusible matrix portion of a composite metal welding rod having granular particles of wear-resistant material substantially uniformly distributed in and surface-alloyed to the more readily fusible matrix metal; and simultaneously depositing such molten metal and the particles therein onto such superficially fused surface.

3. A welding rod comprising an aggregate of particles of hard material having a high temperature of fusion, mixed with a binder of metal having a lower temperature of fusion, and an alloy of the hard material and the binder upon the outer surfaces of said particles, serving to bond said particles and said binder together.

4. A welding rod for depositing hard facing metal fragments on surfaces to be protected thereby comprising a plurality of fragments of tungsten carbide bound together in the form of a welding rod by a fused metal binder of materially lower melting point.

5. Welding rod which comprises small granules of diamond substitute and a matrix of inter-granule metal bonded to the granules, said inter-granule metal being fusible at torch welding temperatures.

6. Welding rod which comprises faceted granules of tungsten carbide closely associated with each other and a matrix of inter-granule metal bonded to the granules, said inter-granule metal being fusible at torch welding temperatures.

7. A welding rod of the character described, comprising a solid body including particles of tungsten carbide mixed with a metallic binder of lower fusion point than said tungsten carbide.

8. A welding rod of the character described, comprising particles of metallic diamond material substantially evenly distributed throughout and surface-alloyed with a matrix metal of lower fusion point.

9. A composite welding rod comprising particles of wear-resistant material substantially uniformly distributed in and surface-alloyed to a more readily fusible matrix material.

10. A composite welding rod according to claim 9, in which said wear-resistant material comprises a non-ferrous metal alloy.

11. A composite welding rod according to claim 9, in which said matrix material comprises a non-ferrous metal alloy.

12. A composite welding rod according to claim 9, in which said matrix material comprises a non-ferrous metal or alloy such as copper or bronze.

13. A welding rod of the character described, comprising a solid body including particles of tungsten carbide mixed with metallic binder particles of lower fusion point.

14. A welding rod of the character described, comprising particles of metallic diamond material substantially evenly mixed with metallic particles of lower fusion point, secured together in a solid body by fusion.

15. A welding rod of the character described, comprising particles of metallic diamond material mixed with metallic particles of lower fusion point, secured together in a solid body by fusion of said metallic particles of lower fusion point.

16. A welding rod of the character described, comprising particles of metallic material mixed with particles of a fusible binder, secured in a composite body by fusion.

17. A welding rod comprising fragments of hard material having a relatively high melting point, and a metallic body having a lower melting point than said fragments and bonding them together.

18. A welding rod comprising fragments of tungsten carbide and a metallic body having a substantially lower melting point than said tungsten carbide and bonding said fragments together.

WILLIAM A. WISSLER.